United States Patent
Zimmer et al.

(10) Patent No.: US 7,243,353 B2
(45) Date of Patent: Jul. 10, 2007

(54) METHOD AND APPARATUS FOR MAKING AND USING A FLEXIBLE HARDWARE INTERFACE

(75) Inventors: Vincent J. Zimmer, Federal Way, WA (US); Michael D. Kinney, Olympia, WA (US); Andrew J. Fish, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 10/187,011

(22) Filed: Jun. 28, 2002

(65) Prior Publication Data

US 2004/0003129 A1 Jan. 1, 2004

(51) Int. Cl.
*G06F 9/44* (2006.01)
(52) U.S. Cl. .............................. 719/310; 710/1; 710/5
(58) Field of Classification Search ................ 719/310; 710/8, 65, 260, 310, 3, 14, 36, 37, 1, 5; 714/5; 711/170
See application file for complete search history.

(56) References Cited

U.S. PATENT DOCUMENTS

| | | | |
|---|---|---|---|
| 4,771,403 A * | 9/1988 | Maskovyak et al. .......... 710/14 |
| 4,783,730 A * | 11/1988 | Fischer .......................... 710/5 |
| 5,655,148 A * | 8/1997 | Richman et al. ............... 710/8 |
| 5,931,935 A * | 8/1999 | Cabrera et al. ............. 710/260 |
| 6,098,128 A * | 8/2000 | Velez-McCaskey et al. .. 710/65 |
| 6,112,263 A * | 8/2000 | Futral ........................... 710/37 |
| 6,182,182 B1 * | 1/2001 | Bradley et al. ............. 710/310 |
| 6,223,266 B1 * | 4/2001 | Sartore ....................... 711/170 |
| 6,557,055 B1 * | 4/2003 | Wiese .......................... 710/36 |
| 6,571,206 B1 * | 5/2003 | Casano et al. ................ 703/25 |
| 6,898,643 B2 * | 5/2005 | Joyeau et al. ................. 710/3 |
| 6,996,706 B1 * | 2/2006 | Madden et al. ................ 713/2 |
| 2003/0028819 A1* | 2/2003 | Chiu et al. ..................... 714/5 |

\* cited by examiner

*Primary Examiner*—Van Nguyen
(74) *Attorney, Agent, or Firm*—Blakely, Sokoloff, Taylor & Zafman LLP

(57) ABSTRACT

In one embodiment a method includes accessing a hardware specific module with a request to perform an unmodified I/O (input/output) operation. The method also includes the hardware specific module accessing a processor specific module with a modified request to perform the I/O operation, the modified request suitable for use with a specific hardware component. The method further includes the processor specific module performing the modified I/O operation with the specific hardware component. The method may further include breaking operations into sub-operations that accomplish part of the operation, and use of transactions that may require multiple operations. Apparatus are also disclosed for implementing the method.

21 Claims, 10 Drawing Sheets

| PROCESSOR INTERFACE | 510 |
|---|---|
| BIOS | 520 |
| DEVICE INTERFACE | 530 |

METHOD AND APPARATUS FOR MAKING AND USING A FLEXIBLE HARDWARE INTERFACE

BACKGROUND OF THE INVENTION

1. Field of the Invention

The invention generally relates to software used to interface with hardware and more specifically relates to software for use in low-level input/output operations.

2. Description of the Related Art

Classically, a computer or other computing device had a single processor and a relatively fixed set of additional devices such as peripheral components. When the computer started operation, the processor utilized a BIOS (Basic Input Output System) to communicate with the rest of the system until more sophisticated software such as an operating system could be started. As operation of the computer proceeded, the operating system would still need to communicate with the rest of the computer, and might use the input/output (I/O) code available in the BIOS for this communication, along with drivers included in the operating system for this purpose. Alternatively, the operating system would use its own code, possibly including drivers, which might read addresses for I/O from the BIOS but otherwise leave the BIOS undisturbed during normal operation. The BIOS code typically included some basic in (input) and out (output) instructions which the processor simply executed, and in some instances also included various setup and cleanup instructions which served to make I/O effective and coherent.

Much of this theory of operations depended on dedicated memory locations (addresses) that could be used to write to or read from registers associated with hardware other than the processor. Typically, these addresses could be set using hardware configuration devices such as jumpers or fuses, resulting in a few dedicated addresses at which the device or component in question could be accessed. In early IBM PC systems, the addresses in question typically were close to the zero address of the system, and in some systems were always in the zero to 4095 range (or 0–64K range for latter systems). Moreover, in some systems, the BIOS would have dedicated addresses associated with it, where certain routines within the BIOS could be found, or where the BIOS would look for certain data. Additionally, strong ordering of operations was the norm, if a first datum was written at a first address in a program, and then a second datum was written at a second address, there was no chance that the second datum would be written before the first datum was written. When the first datum was data to be written, and the second datum was an instruction to write the information to disk, this ordering was important.

With the advent of newer technology, this model is not as simple. Multiple processors are involved in some systems. Processors include pipelining with complicated models for conditional processing of branches, stalls due to delays in the system, and parallel execution of instructions. Caches introduce further complexity, allowing for data to be read and written at a first location without going beyond the cache to the device dedicated to storing data at the first location. Components may be inserted or removed from a system in real-time during normal operation. Virtual memory management may mean that the processor understands that a piece of data is being written at a first location but the surrounding I/O components redirect that data to a second location based on page tables and other translations of addresses. All of these changes to the computer mean that the basic input and output routines may be much more complicated to write and manage than they were in earlier days.

Recently, a new standard, known as the Extensible Firmware Interface (EFI), was introduced. As its name implies, EFI enables systems that employ the interface and associated architecture to extend the firmware operations of those systems beyond the basic services provided by the BIOS or original firmware that is provided with system. Under EFI, various system level events, such as I/O operations, are handled through drivers that are specifically tailored for such tasks. Typically, the EFI drivers are written to support particular CPU architectures. As a result, respective sets of drivers must be written for each processor architecture. In addition to processor-architecture considerations, the firmware drivers need to support both physical and virtual CPU execution modes, so that I/O operations can be performed in the pre-boot environment, the OS present environment, and in exception-handling code that may execute in virtual and physical execution modes.

BRIEF DESCRIPTION OF THE DRAWINGS

The present invention is illustrated by way of example and not limitation in the accompanying figures. As will be appreciated, characteristics of an embodiment of the invention need not appear in all embodiments within the spirit and scope of the invention.

DETAILED DESCRIPTION

Figure 1:
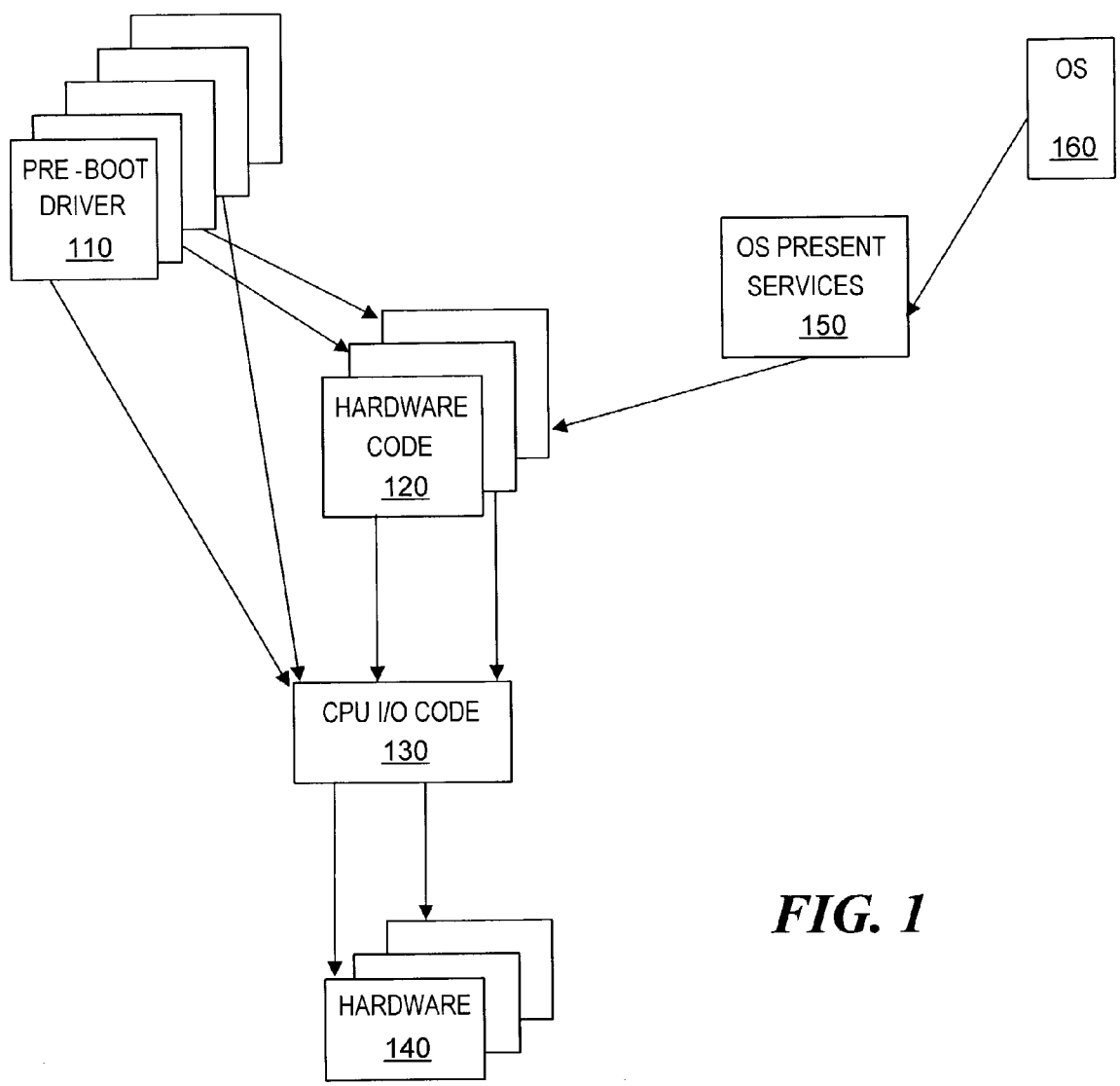
FIG. 1 illustrates an embodiment of a system.

A method and apparatus for making and using a flexible hardware interface is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

The present invention is described by way of example and not limitation. As will be appreciated, characteristics of an embodiment of the invention need not appear in all embodiments within the spirit and scope of the invention. In one embodiment, the invention is a method. The method includes accessing a hardware specific module with a request to perform an unmodified I/O (input/output) operation. The method also includes the hardware specific module accessing a processor specific module with a modified request to perform the I/O operation, the modified request suitable for use with a specific hardware component. The method further includes the processor specific module performing the modified I/O operation with the specific hardware component. The method may further include breaking operations into sub-operations that accomplish part of the operation, and use of transactions that may require multiple operations.

In an alternate embodiment, the invention is a system. The system includes a processor. The system also includes a memory coupled to the processor. The system further includes a firmware coupled to the processor. The system also includes a specific hardware component coupled to the processor. The firmware includes instructions for execution by the processor, which when executed by the processor, cause the processor to access a hardware specific module with a request to perform an unmodified I/O (input/output) operation. The instructions further cause the processor further to use the hardware specific module to access a processor specific module with a modified request to perform the I/O operation, the modified request suitable for use with the specific hardware component. The instructions also cause the processor further to use the processor specific module to perform the modified I/O operation with the specific hardware component.

In an alternate embodiment, the invention is an apparatus. The apparatus includes a hardware specific logic block to receive a request to perform an unmodified I/O operation and to access a processor specific logic block with a modified request to perform the I/O operation, the modified request suitable for use with a specific hardware component. The apparatus also includes the processor specific logic block to receive the modified request and to perform an I/O operation with the specific hardware component based on the modified request.

FIG. 1 illustrates an embodiment of a system. Pre-boot modules 110 include software that may be used in a pre-boot environment to access hardware within a system. Hardware modules 120 include device or component specific code which may be used to access a given device or component. CPU modules 130 include processor specific code that may be used to affect an access to hardware given proper information on addresses and parameters. Hardware 140 is the actual hardware of the system that may be accessed using the various modules. OS present services 150 are a group of modules containing code suitable for accessing devices when the operating system 160 is present and operating.

Pre-boot modules 110 are modules used in initial operations by a system (such as during start-up for example) to effect I/O (input and output) between the processor of the system and other hardware of the system. The pre-boot modules 110 are written to either access hardware specific code in the hardware modules 120, or to access the CPU modules 130 directly if appropriate.

The hardware modules 120 are designed to access routines of the CPU modules 130 with pre-determined input and/or output parameters appropriate for the hardware (device or component) to be accessed. Thus, the hardware modules 120 supply arguments, addresses, or other necessary data, and call a routine of the CPU modules 130, using specific information about how the hardware to be accessed operates, and without using specific information about how the CPU module 130 will effect an input or output transaction. The CPU modules 130 are coded with the opposite intent. The CPU modules 130 include routines designed to allow a specific processor to effect an input or output of data to a specified address for example, without any information about what the effect of writing to or reading from the specific location will be.

So, the hardware module 120 for a graphics subsystem may supply an address appropriate for accessing the graphics subsystem and data in the appropriate format. The corresponding CPU module 130 may then use the supplied address and data to complete a simple write, and the transaction may thus be accomplished. In some embodiments, the CPU module 130 may handle such aspects of processor control as setting flags for non-cacheable and strongly ordered I/O transactions, or for reordering from big-endian to small-endian or vice versa the data bytes of a transaction. Similarly, the hardware module 120 may use several calls to the CPU module 130 in order to initialize a component and then actually perform a read or write, with a first call to write a pre-determined initialization value to a pre-determined address of the component to accomplish such initialization.

The CPU module 130 is written to receive addresses and data and use those in conjunction with a specific kind of processor. The hardware module 120 is written to interface with a specific component (a specific graphics subsystem for example), regardless of the processor involved. Thus, maintenance of the code for the overall system is simplified. The hardware module 120 may be swapped based on actual installed hardware, and the CPU module 130 may be swapped based on actual installed processor(s).

The pre-boot module 110 may then be generic, calling an expected graphics subsystem initialization routine within the hardware module 120 for example. The specific graphics subsystem initialization routine present within the hardware module 120 may then accomplish the task of initializing the specific graphics subsystem present, using expected input and output routines available in the CPU module 130. The CPU module 130 may supply specific output and input routines based on the processor present, without regard to the hardware device that is being initialized. Similarly, general input and output to components and subsystems may be accomplished by the pre-boot modules 110. Moreover, the same hardware module 120 and CPU module 130 may then be used by the OS present services 150 in the same manner for access to components or devices during operation by the operating system 160.

Figure 2:
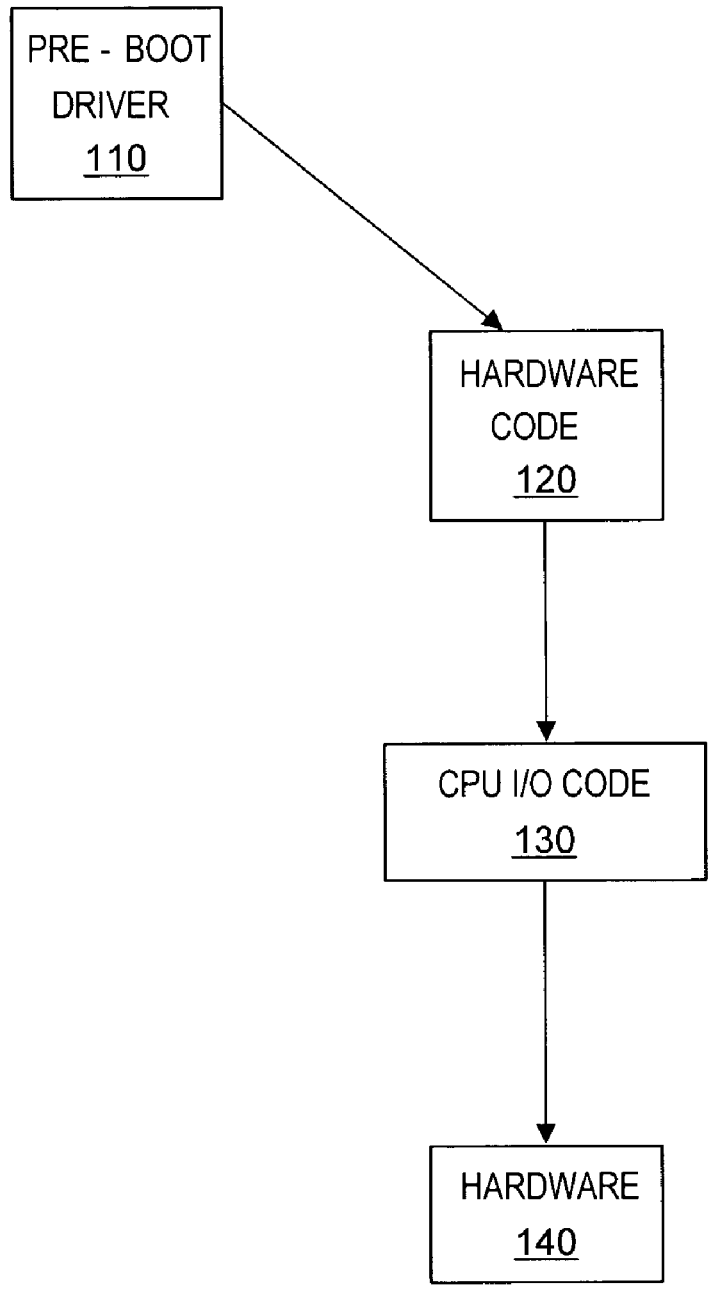
FIG. 2 illustrates an embodiment of the system in pre-boot or physical mode.

FIG. 2 illustrates an embodiment of the system in pre-boot or physical mode. Prior to bringing the operating system online, the system operates without the OS present services. Thus, the only access to components of the system is through the pre-boot modules 110. This type of access may also be achieved during operation of the system in physical mode. Physical mode typically is a mode in which most abstractions (such as virtual memory for example) are not available, and the interface tends to be more primitive as a result. Thus, the pre-boot modules 110 may be used in more situations than those arising prior to presence of the OS.

Figure 3:
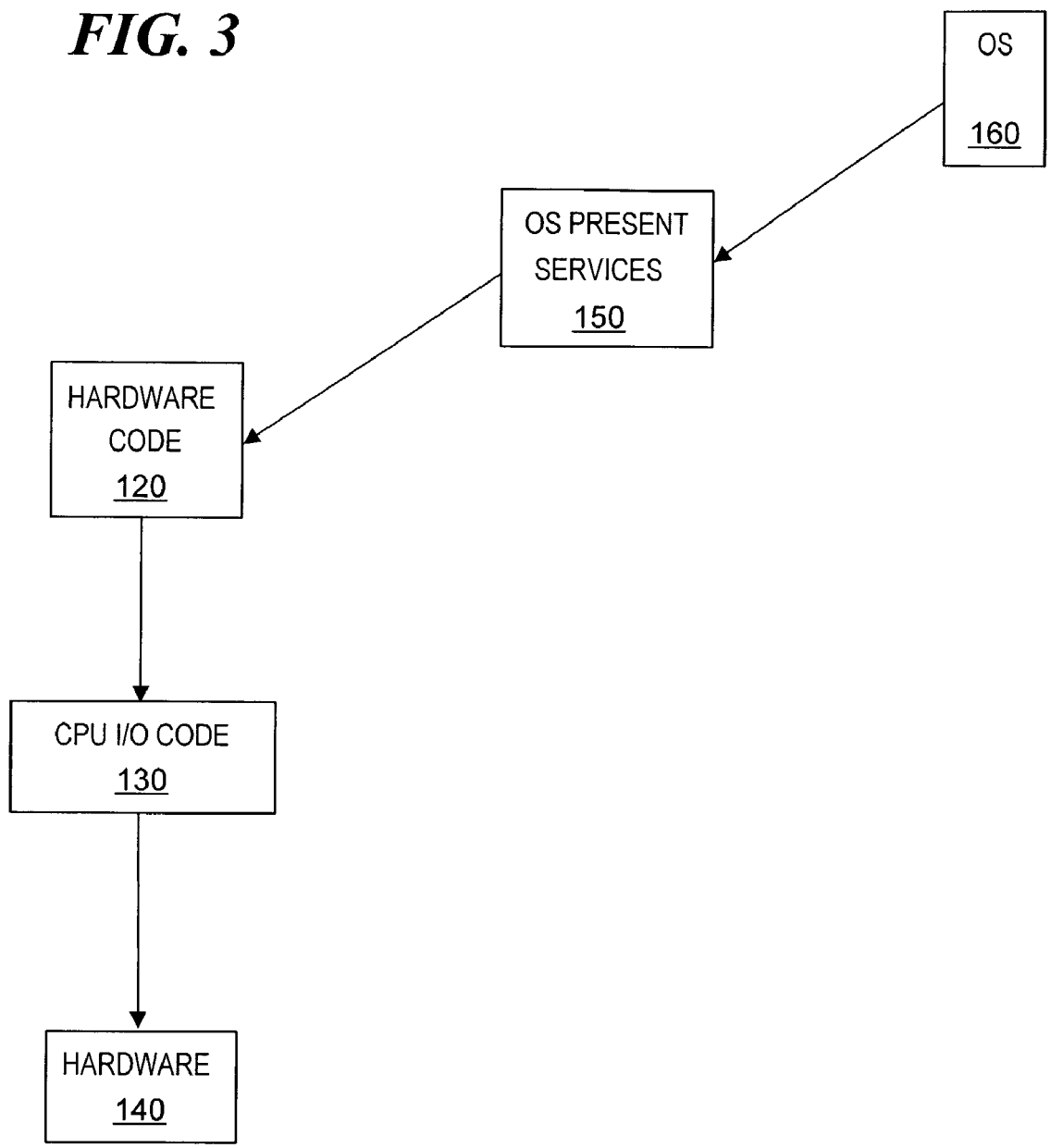
FIG. 3 illustrates an embodiment of the system when an operating system is present, or in virtual mode.

FIG. 3 illustrates an embodiment of the system when an operating system is present, or in virtual mode. With the operating system present, or in virtual mode, the pre-boot modules are not necessary, the operating system 160 may use services 150 to access components. As will be appreciated, in both illustrations of FIGS. 2 and 3, the hardware modules 120 (hardware dependent code) and CPU modules 130 (processor dependent code) are present and are used to effect I/O transactions.

Figure 4:
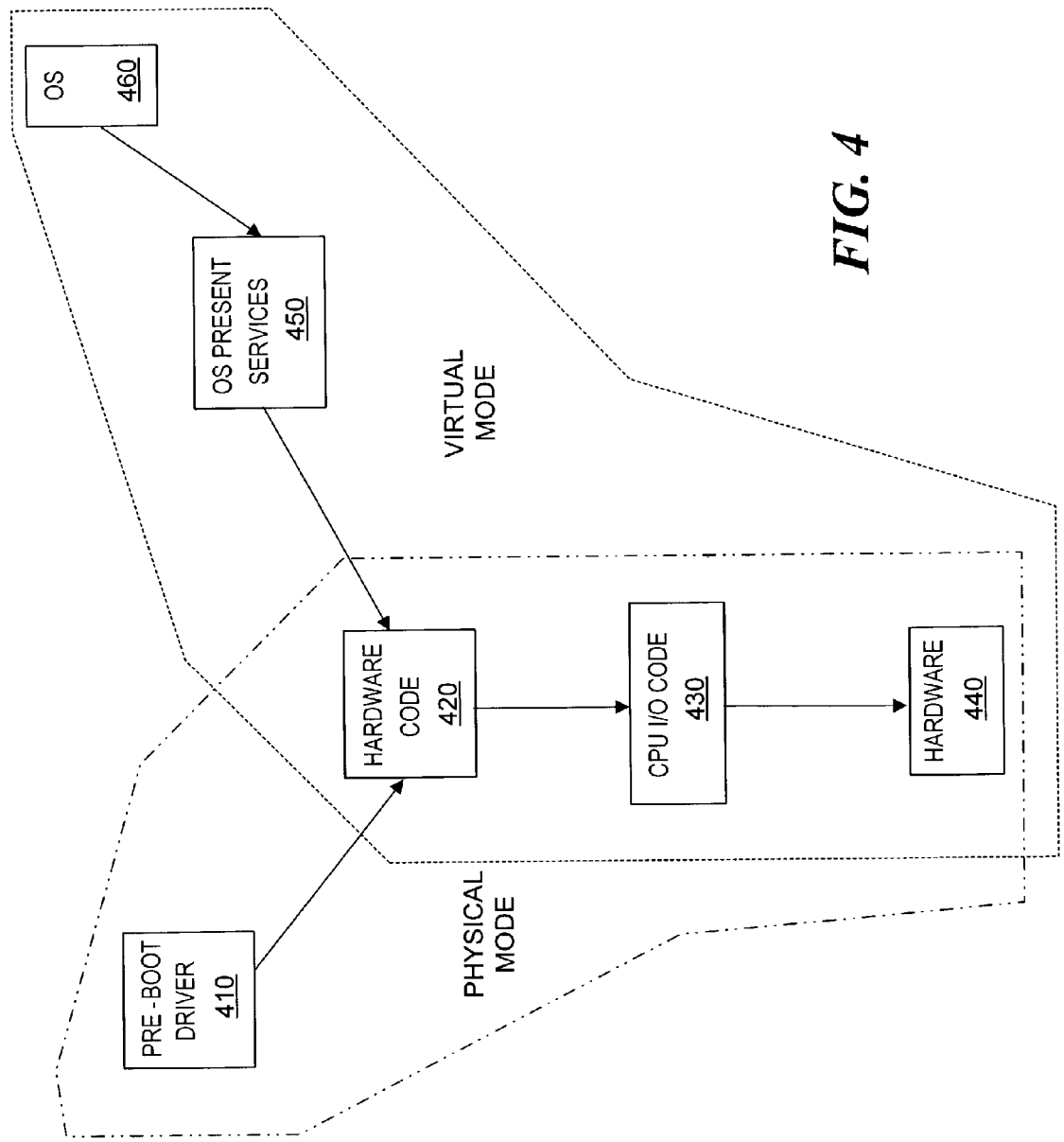
FIG. 4 illustrates an alternate embodiment a system having both a physical and a virtual mode.

FIG. 4 illustrates an alternate embodiment of a system having both a physical and a virtual mode. Pre-boot modules 410 are written for low-level use, such as during boot phase or during operation in physical mode. Operating system 460 and operating system present services 450 are written for use during operation in virtual mode, or with the operating system present. As will be appreciated, systems may occasionally switch between these two modes or contexts, thus allowing for switches between which of the two types of modules (410 or 450) are used. Moreover, as will be appreciated, the hardware modules 420, CPU modules 430 and hardware 440 are used in either mode. Hardware modules 420 are hardware specific modules, CPU modules 430 are processor specific modules, and hardware 440 is the actual hardware of the system.

Figures 5, 6:
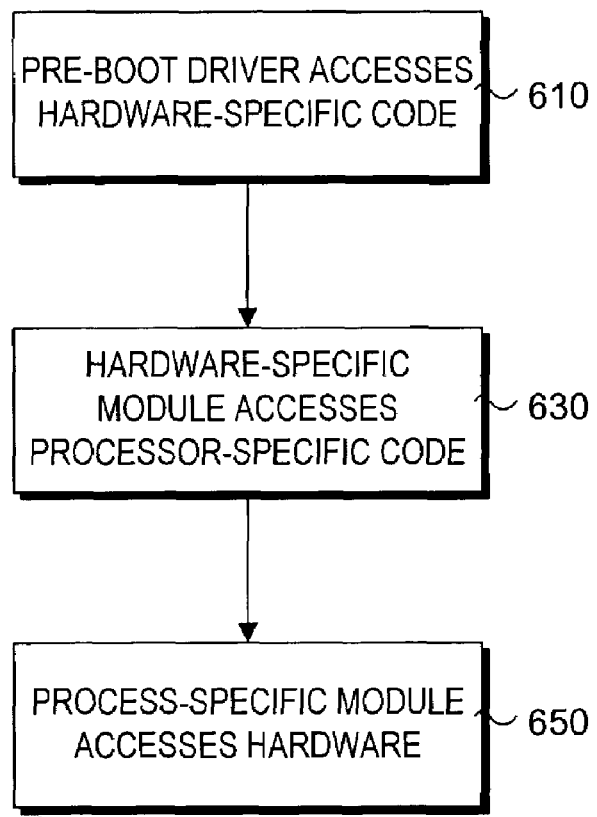
FIG. 5 illustrates a conceptual view of an embodiment of a system.
FIG. 6 illustrates an embodiment of a process of operating in pre-boot or physical mode.

FIG. 5 illustrates a conceptual view of an embodiment of a system. The processor interface 510 allows access to and from the processor. The device interface 530 allows access to and from various devices or components of the system. Between them during pre-boot or boot (prior to loading the operating system) phase is the firmware 520. This abstraction represents a typical use of the firmware as a repository of code allowing interaction between the processor and other devices or components of a system. What is actually included in the firmware physically, or in other components physically, is not necessarily exactly represented by this abstraction. However, the idea that the processor need not have specific information about other components and that other components need not have specific information about the processor is clearly illustrated here.

FIG. 6 illustrates an embodiment of a process of operating in pre-boot or physical mode. At block 610, the pre-boot driver or module accesses hardware specific code of a hardware module in order to accomplish an I/O operation. At block 630, the hardware specific code of the hardware module accesses processor specific code to effect the I/O operation using the processor. At block 650, the processor specific code accesses the hardware under direction from the hardware module and pre-boot driver.

Figure 7:
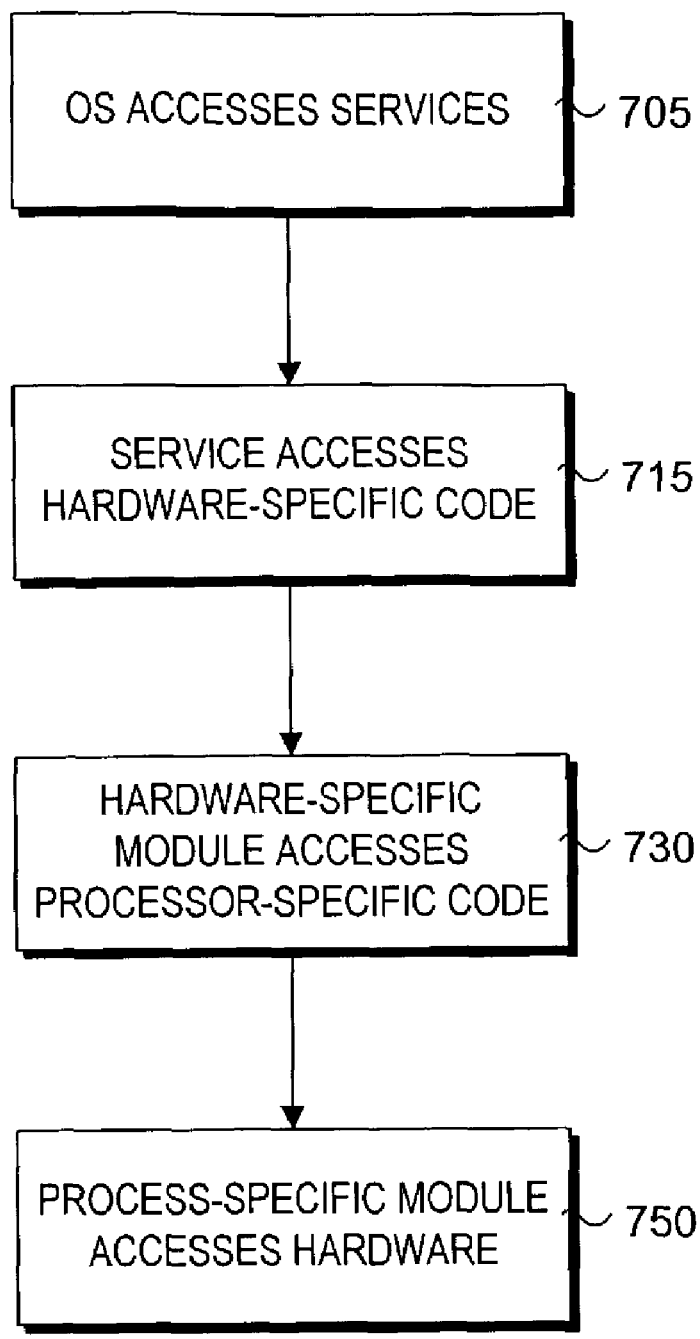
FIG. 7 illustrates an embodiment of a process of operating in operating system or virtual mode.

Alternatively, FIG. 7 illustrates an embodiment of a process of operating in operating system or virtual mode. At block 705, the operating system accesses an operating system present service to accomplish an I/O transaction. At block 715, the service accesses hardware specific code of a hardware module to accomplish the I/O transaction. At block 730, the hardware specific code of the hardware module accesses processor specific code to effect the I/O transaction using the processor. At block 750, the processor specific code accesses the hardware under direction from the hardware module and the operating system present service. Note that the method may actually represent execution of instructions by a single or multiple processors, where the instructions are included in each of the pre-boot or operating system present modules, hardware modules, and CPU modules.

Figure 8:
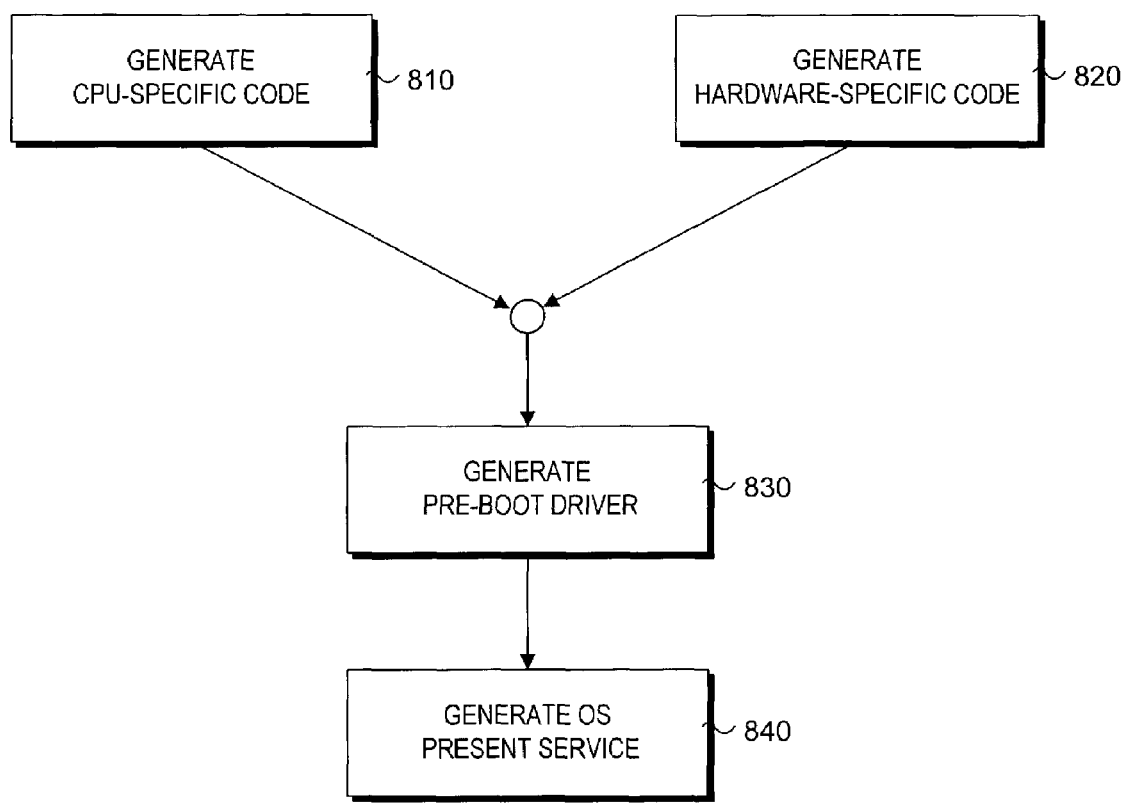
FIG. 8 illustrates an embodiment of a process of making a flexible interface.

FIG. 8 illustrates an embodiment of a process of making a flexible interface. At block 810, processor specific code is generated, allowing for basic input and output operations. This may include simple in and out instructions as are available with some processors, or use of more complex load and store instructions for example, with conditions set to accomplish proper I/O. At block 820, hardware specific code for a specific component or device of a system is generated, allowing a processor to set up an expected processor input or output operation to occur at the correct pre-determined address for example, or with the correct pre-determined access protocol. At block 830, the pre-boot driver for the system is generated, based on an understanding of what will be required to access the hardware modules (hardware specific code) and potentially the CPU modules (processor specific code) as well. At block 840, the OS present service is generated, with a similar understanding of what is required to access the other modules. Note that the interfaces may be specified in advance, such that the various modules may be developed in any order, as long as the interfaces specified are actually used by the modules.

Figure 9C:
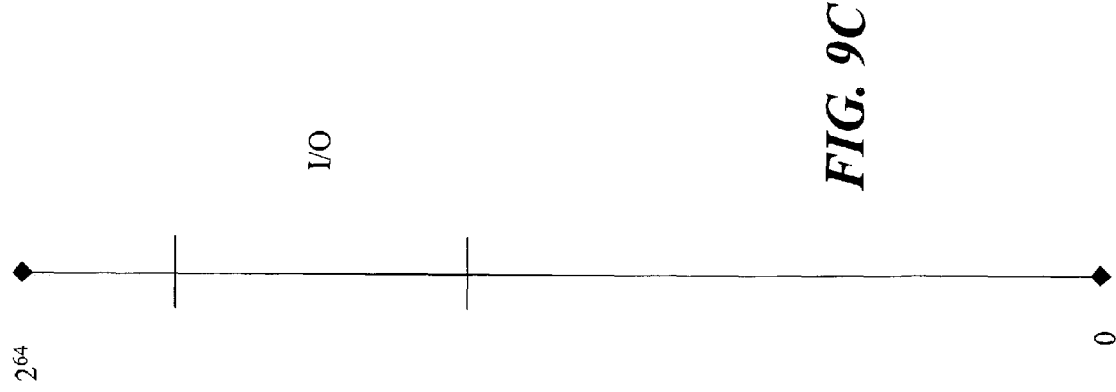
FIG. 9C illustrates another memory space.
Figure 9B:
FIG. 9B illustrates another memory space.
Figure 9A:
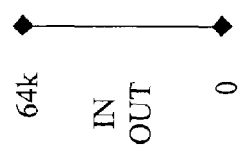
FIG. 9A illustrates a memory space.

FIG. 9A illustrates a memory space. The memory space is the "magic memory" or space where devices and components may be accessed within the system during physical or pre-boot mode. In and out instructions allow for access to these memory locations, and the locations may actually correspond to registers in devices other than the processor. FIG. 9B illustrates another memory space. This is a virtual memory space for a processor with 4 GB of addressable space, and illustrates the memory mapping of the original "magic memory" to a different area of the memory space. FIG. 9C illustrates another memory space. In this illustration, the addressable space is for a 64 bit address, and the original "magic memory" addresses are dispersed to a larger area of the address space in virtual mode. Keeping track of where the memory locations used for physical I/O with components and devices are mapped within the virtual address space is preferably the job of operating system present services, and abstracted out of the hardware and CPU modules.

Figure 10:
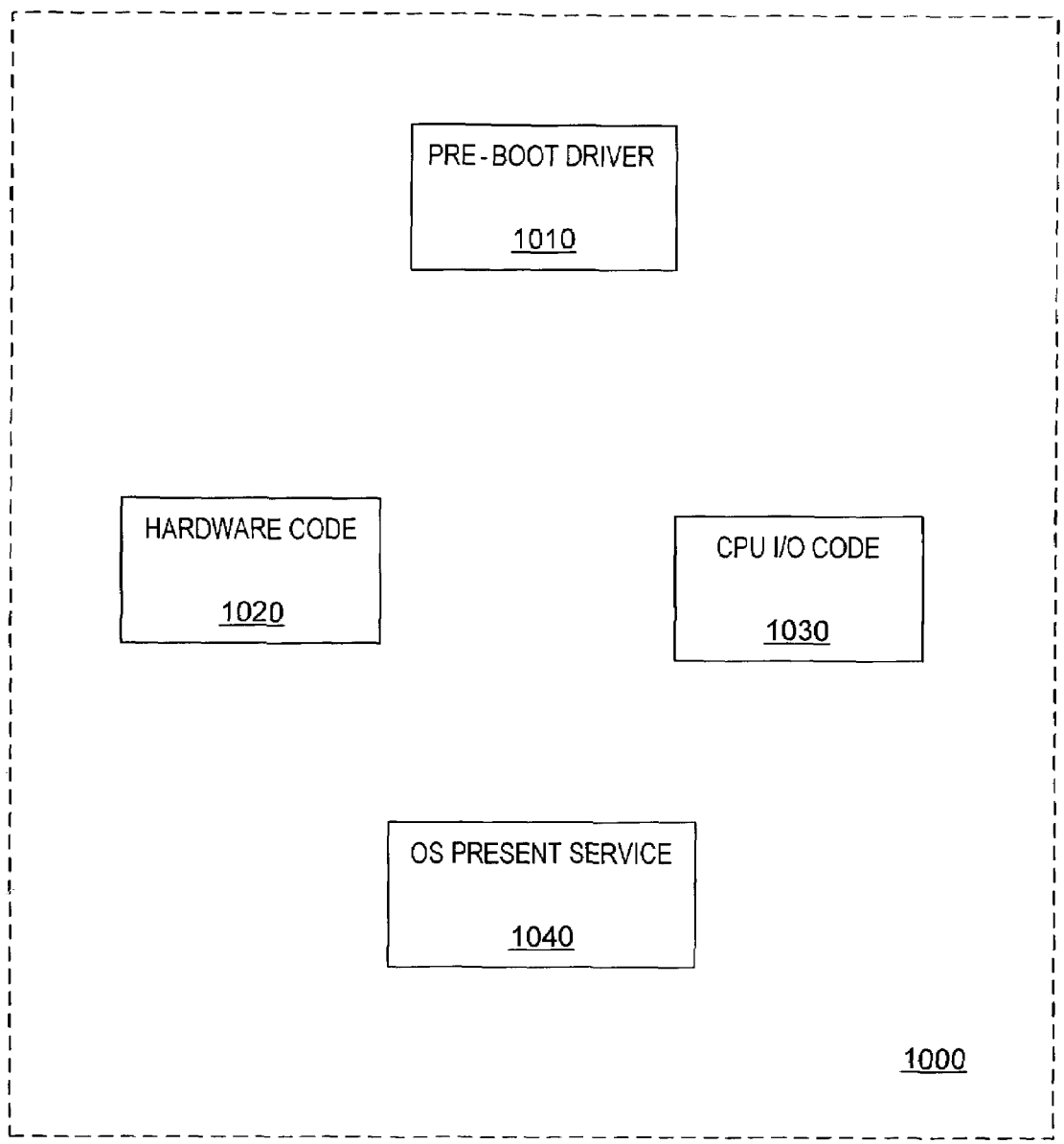
FIG. 10 illustrates an embodiment of a medium.

FIG. 10 illustrates an embodiment of a medium. Medium 1000 may represent a single medium or media, either of different types or multiple pieces of a single type of media. Included are pre-boot driver(s) 1010, hardware specific code 1020, processor specific code 1030, and operating system present services 1050. Each of these modules (1010, 1020, 1030, 1050) may be present in one or more media within a system and thereby be machine-readable and accessible by the processor of a system. Moreover, each of these modules may be expected to be formed of executable code which may be executed by a processor. Additionally, in some embodiments, these modules may be implemented in other manners allowing for machine access or processor access to them.

Some portions of the detailed description are presented in terms of algorithms and symbolic representations of operations on data bits within a computer memory. These algorithmic descriptions and representations are the means used by those skilled in the art to most effectively convey the substance of their work to others skilled in the art. An algorithm as described here is generally conceived to be a self-consistent sequence of acts or operations leading to a desired result. The acts are those requiring physical manipulations of physical quantities. Usually, though not necessarily, these quantities take the form of electrical or magnetic signals capable of being stored, transferred, combined, compared and otherwise manipulated. It has proven convenient at times principally for reasons of common usage to refer to these signals as bits, values, elements, symbols, characters, terms, numbers, data or the like.

It should be borne in mind, however, that all of these in similar terms are to be associated with the appropriate physical quantities and are merely convenient labels applied to these quantities. Unless specifically stated otherwise as apparent from the following discussion it is appreciated that throughout the description discussions utilizing terms such as "processing" or "computing" or "calculating" or "determining" or "displaying" or the like refer to the action and processes of a computer system or similar electronic computing device that manipulates and transforms data represented as physical (electronic) quantities within the computer systems registers and memories into other data similarly represented as physical quantities within the computer system memories or registers or other such information storage transmission or display devices. The present invention can be implemented by an apparatus for performing the operations described herein. This apparatus may be specially constructed for the required purposes or it may comprise a machine such as a general-purpose computer selectively activated or reconfigured by a computer program stored in the computer. Such a computer program may be stored in a machine readable storage medium such as but not limited to any type of disk including floppy disks, optical disks, CD-ROMS and magnetic optical disks, read only memories, random access memories, EPROMS, EEPROMS, magnetic or optical cards or any type of media suitable for storing electronic constructions and each coupled to a computer system bus. Each of these media may be coupled to a computer system bus through use of an appropriate device for reading and or writing the media in question. Specialty apparatus may include a collection of readily available pieces or an application specific integrated circuit including a series of logic blocks for example. The blocks of FIGS. 1–6 or 10, for example, may be suitable for implementation as logic blocks, as may other configurations of the method, system and apparatus described herein.

The algorithms and displays presented herein are not inherently related to any particular computer or other apparatus. Various general-purpose systems may be used with programs in accordance with the teachings herein or it may prove convenient to construct more specialized apparatus to perform the required method. For example, any of the methods according to the present invention can be implemented in hard-wired wired circuitry by programming a general purpose processor or by any combination of hardware and software. One of skill in the art will immediately appreciate that the invention can be practiced with computer system configuration. Configurations other than those described below including hand held devices, multi processor systems, microprocessor based or programmable consumer electronics, network PCs, mini computers, main frame computers and the like. The invention may also be practiced in distributed computing environments or tasks or performed by remote processing devices that are linked through a communications network. The required structure for a variety of these systems will appear from the description below.

The methods of the invention may be implemented using computer software. If written in a programming language conforming to a recognized standard sequence of instructions designed to implement the methods can be compiled for execution on a variety of hardware platforms or machines and for interface to a variety of operating systems. In addition the present invention is not described with reference to any particular programming language. It will be appreciated that a variety of programming languages may be used to implement the teachings of invention as described herein. Furthermore, it is common in the art to speak of software in one form or another (for example program procedure application etc.) as taken in action or causing a result. Such expressions are merely a shorthand way of saying that execution of the software by a computer causes the processor of the computer to perform an action or produce a result.

Figure 11:
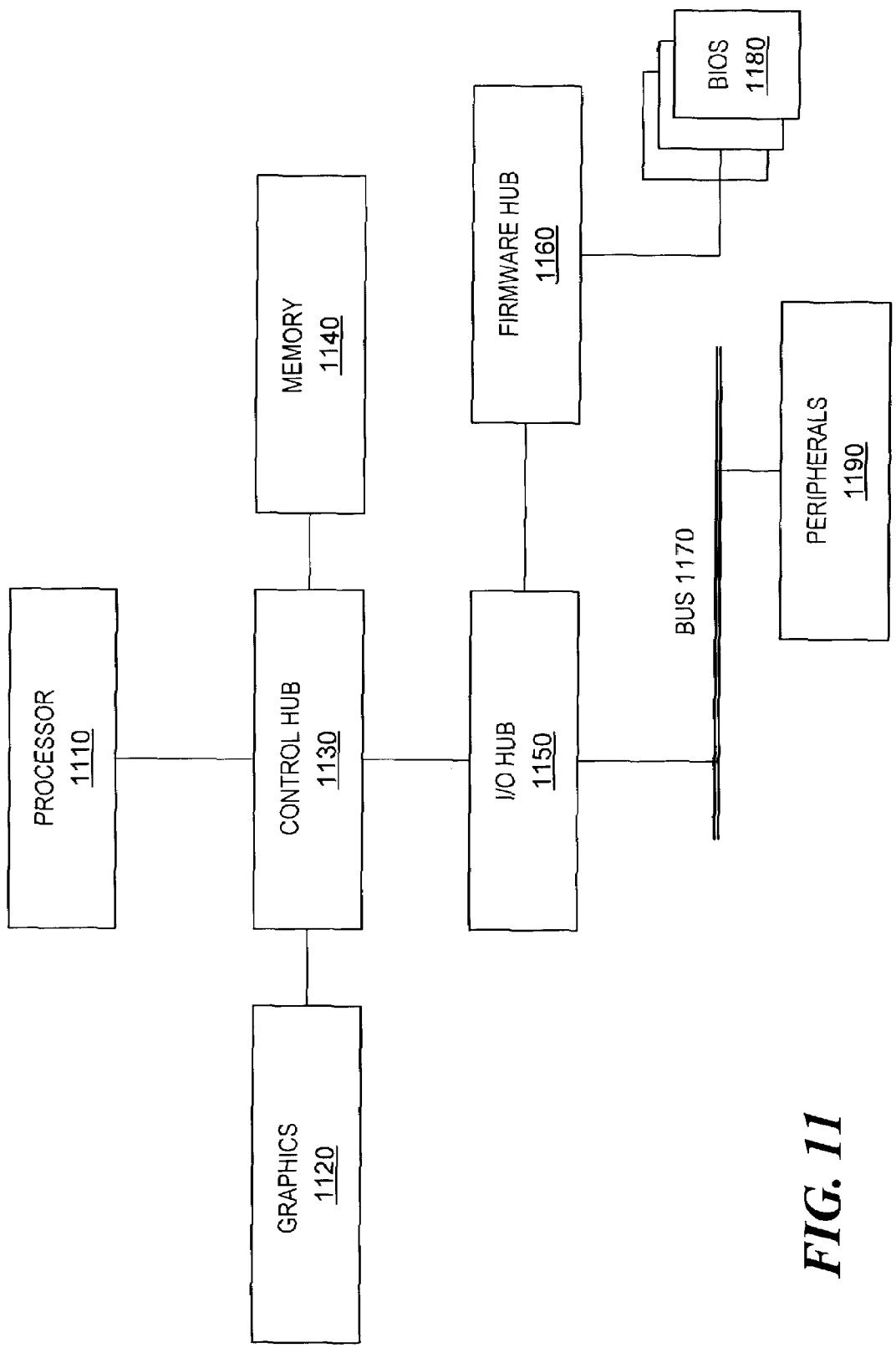
FIG. 11 illustrates an embodiment of a system.

FIG. 11 illustrates an embodiment of a system that may be used with a medium embodying instructions. Processor 1110 is a processor capable of executing instructions, such as those processors available from Intel™ Corporation of Santa Clara, Calif. Coupled to the processor 1110 is control hub 1130, which may be used to control access between the processor and other devices or components of the system. Coupled to the control hub 1130 is graphics subsystem 1120 that may be used to control display or graphics portions of the system. Also coupled to the control hub 1130 is memory 1140, which may be used to store data or instructions suitable for use with processor 1110 and other devices.

Furthermore, I/O (input/output) control hub 1150 is coupled to control hub 1130. I/O control hub 1150 may be used to control the interface between input/output devices such as mass storage devices or communications devices for example and the rest of the system. Coupled to I/O control hub 1150 is firmware hub 1160, which permits access to firmware 1180, a firmware for the system which may be used in pre-boot and boot phases to start the computer. Also coupled to I/O control hub 1150 is a bus 1170, and coupled to bus 1170 are peripherals 1190 which may be the aforementioned mass storage devices or communications devices for example.

The firmware may contain all or parts of processor modules similar to CPU modules 130, hardware specific modules similar to hardware modules 120, and pre-boot modules similar to pre-boot modules 110 for example. Otherwise, portions of hardware specific modules may be stored in memory 1140 or on one of peripherals 1190 for example. Similarly, portions of processor modules may be stored in memory 1140 or on one of peripherals 1190 for example. At minimum, a processor module suitable for use with processor 11 10 must be accessible within firmware 1180.

Various descriptions of this document have related to devices or components being coupled together. Coupling typically denotes a relationship allowing for communication or connection between a first and second object. The first object may be directly connected to the second object. Alternatively, the first object may be directly connected to a third object that may also be directly connected to the second object, thereby achieving a coupling between the first object and the second object. As will be appreciated, the number of intermediate objects between two objects that are coupled together does not determine whether the objects are coupled, the presence of a link between the two objects indicates that the two objects are coupled together.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 11 may be integrated into components, or may be subdivided into components. Similarly, the blocks of FIG. 5 (for example) represent portions of a method, which in some embodiments, may be reordered or may be organized in parallel rather than in a linear or step-wise fashion. The present specification and figures are accordingly to be regarded as illustrative rather than restrictive.

What is claimed is:

1. A method comprising:
accessing a hardware specific module with a request to perform an unmodified I/O (input/output) operation, wherein the hardware specific module includes code to access a specific hardware component irrespective of how a specific processor effects I/O operations of the specific hardware component;
the hardware specific module accessing a processor specific module with a modified request to perform a modified I/O operation, the modified request suitable for use with the specific hardware component, wherein the processor specific module includes code to effect the modified I/O operation using the specific processor; and
the processor specific module performing the modified I/O operation with the specific hardware component,
wherein the request is presented to the hardware specific module by a pre-boot driver.

2. The method of claim 1, wherein the modified request includes setup information for the specific hardware component.

3. The method of claim 2, wherein the hardware specific module accesses the processor specific module multiple times for the unmodified I/O operation, each access including a modified I/O sub-operation.

4. The method of claim 1, wherein the modified I/O operation includes only a pre-determined address for the specific hardware component and data from the unmodified I/O operation.

5. The method of claim 1, wherein the processor specific module performs the modified I/O operation by performing a basic input operation at an address specified by the hardware specific module.

6. The method of claim 1, wherein the processor specific module performs the modified I/O operation by performing a basic output operation at an address specified by the hardware specific module with data from the request to perform the unmodified I/O operation.

7. The method of claim 1, wherein the request is presented to the hardware specific module by an operating system present service.

8. The method of claim 7, wherein the request is presented during a virtual mode operation of the specific processor.

9. The method of claim 7, further comprising:
an operating system accessing the operating system present driver with a request to perform an I/O transaction, the unmodified I/O operation derived from the I/O transaction.

10. The method of claim 1, wherein the request is presented during a physical mode operation of a processor.

11. The method of claim 1, wherein the request is presented during a pre-boot operation.

12. A system comprising:
a processor;
a memory coupled to the processor, having instructions stored therein including a hardware specific module and a processor specific module;
a specific hardware component coupled to the processor,
a firmware device coupled to the processor, having firmware stored thereon; which when executed by the processor cause the processor to:
access the hardware specific module with a request to perform an unmodified I/O (input/output) operation, wherein the hardware specific module to enable access to the specific hardware component irrespective of how a processor type of the processor effects I/O operations of the specific hardware component,
use the hardware specific module to access the processor specific module with a modified request to perform a modified I/O operation, the modified request suitable for use with the specific hardware component, wherein the processor specific module to effect the modified I/O operation using the processor type of the processor,
use the processor specific module to perform the modified I/O operation with the specific hardware components; and
a pre-boot driver stored on one of the firmware device or a persistent memory device coupled to the processor, and wherein execution of the firmware further cause the processor to use the pre-boot driver to access the hardware specific module.

13. The system of claim 12, wherein the memory further includes an operating system present driver, and wherein execution of the firmware further causes the processor to:
access the operating system present driver with a request to perform an I/O transaction,
derive the unmodified I/O operation from the I/O transaction, and
present the unmodified I/O operation to the hardware specific module.

14. The system of claim 12, wherein the specific hardware component comprises a hard disk drive.

15. The system of claim 12, wherein the specific hardware component comprises a network connection component.

16. A machine-readable medium having instructions stored thereon, which when executed perform the operations of:
accessing a hardware specific module with a request to perform an unmodified I/O (input/output) operation, wherein the hardware specific module includes code to access a specific hardware component irrespective of how a specific processor effects I/O operations of the specific hardware component;
the hardware specific module accessing a processor specific module with a modified request to perform a modified I/O operation, the modified request suitable for use with the specific hardware component, wherein the processor specific module includes code to effect the modified I/O operation using the specific processor; and
the processor specific module performing the modified I/O operation with the specific hardware component,
wherein the request is presented to the hardware specific module by a pre-boot driver.

17. The machine-readable medium of claim 16, wherein execution of the instructions further performs the operations of:
accessing an operating system present driver via an operating system with a request to perform an I/O transaction; and
deriving the unmodified I/O operation from the I/O transaction via the operating system present driver.

18. The machine-readable medium of claim 16, wherein the modified request includes setup information for the specific hardware component.

19. The machine-readable medium of claim 18, wherein the hardware specific module accesses the processor specific module multiple times for the unmodified I/O operation, each access including a modified I/O sub-operation.

20. The machine-readable medium of claim 16, wherein the processor specific module performs the modified I/O operation by performing a basic output operation at an address specified by the hardware specific module with data from the request to perform the unmodified I/O operation.

21. The machine-readable medium of claim 16, wherein the processor specific module performs the modified I/O operation by performing a basic input operation at an address specified by the hardware specific module.

* * * * *